US011914615B2

(12) United States Patent
Chen

(10) Patent No.: US 11,914,615 B2
(45) Date of Patent: Feb. 27, 2024

(54) MANAGING SHARED OBJECTS IN HYBRID DISTRIBUTED DATABASE SYSTEMS

(71) Applicant: SAP SE, Walldorf (DE)

(72) Inventor: Liang Chen, Kanata (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/407,117

(22) Filed: Aug. 19, 2021

(65) Prior Publication Data
US 2023/0065293 A1   Mar. 2, 2023

(51) Int. Cl.
*G06F 16/27*      (2019.01)
*G06F 16/215*     (2019.01)
*G06F 16/22*      (2019.01)
*G06F 16/23*      (2019.01)

(52) U.S. Cl.
CPC ............ *G06F 16/27* (2019.01); *G06F 16/215* (2019.01); *G06F 16/2228* (2019.01); *G06F 16/2379* (2019.01)

(58) Field of Classification Search
CPC .... G06F 16/27; G06F 16/2379; G06F 16/215; G06F 16/2228
USPC ........................................................ 707/626
See application file for complete search history.

(56) References Cited

U.S. PATENT DOCUMENTS

| 6,848,109 | B1 * | 1/2005 | Kuhn | G06F 9/466 |
| | | | | 718/101 |
| 2014/0237004 | A1 * | 8/2014 | Schreter | G06F 12/0261 |
| | | | | 707/813 |
| 2014/0372490 | A1 * | 12/2014 | Barrus | G06F 16/1873 |
| | | | | 707/814 |
| 2016/0335180 | A1 * | 11/2016 | Teodorescu | G06F 16/221 |
| 2017/0249246 | A1 * | 8/2017 | Bryant | G06F 16/2219 |
| 2017/0277726 | A1 * | 9/2017 | Huang | G06F 3/067 |
| 2018/0121348 | A1 * | 5/2018 | Sharma | G06F 16/25 |
| 2019/0325055 | A1 * | 10/2019 | Lee | G06F 16/1734 |

OTHER PUBLICATIONS

"SAP IQ Administration: Multiplex," Administration Guide, SAP IQ 16.1 SP 04, Document Version: 1.0.0—Apr. 5, 2019, 116 pages.

* cited by examiner

*Primary Examiner* — Cam Linh T Nguyen
(74) *Attorney, Agent, or Firm* — Klarquist Sparkman, LLP

(57) ABSTRACT

Technologies are described for managing shared read-only objects in hybrid distributed database systems. For example, data structures can be maintained for managing the shared read-only objects, comprising a data structure storing a "deleted at" value for each shared read-only object, a data structure storing a "deleted at" value for each secondary node, a data structure storing a indication of which secondary nodes are reading which shared read-only objects, and a data structure storing a reference count indicating a number of active read transactions for each shared read-only object. The shared read-only objects that can be garbage collected can be identified using, at least in part, the data structures. The identified shared read-only objects can then be garbage collected.

20 Claims, 7 Drawing Sheets

MANAGING SHARED OBJECTS IN HYBRID DISTRIBUTED DATABASE SYSTEMS

BACKGROUND

There are two common architectures for implementing distributed database systems, one is referred to as "shared everything" and the other is referred to as "shared nothing." Then there is also a third architecture that is a hybrid of that two common architectures. One example of a hybrid architecture is the SAP® IQ (Intelligent Query) architecture that uses a hybrid architecture in IQ's multiplex configuration.

In a distributed database system using a hybrid architecture, there are multiple database servers, each server having its own local storage, and all the servers have access to shared storage. The shared storage is used for permanent data and shared temporary data for distributed query processing. The local storage is used for catalog metadata, temporary data, and transaction logs.

The shared storage provides access to shared objects by the various servers of the database system. For example, the database system can support creating shared objects, reading shared objects, and deleting shared objects. When a shared object is to be deleted or garbage collected, it can be important to confirm that there are no servers that are currently reading the shared object to avoid an error condition (e.g., if a given shared object is garbage collected before a server has finished reading the shared object, then the server may read corrupted data). In some solutions, locking mechanisms are used to lock shared objects while they are actively being read. However, such locking mechanisms have a number of drawbacks. For example, locking mechanisms can suffer from poor performance and poor availability, and can be complicated to implement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for managing shared read-only objects in hybrid distributed database systems. For example, a number of data structures can be maintained for managing the shared read-only objects. In some implementations, four data structures are maintained for managing the shared read-only objects. The first data structure comprises, for each a plurality of shared read-only objects, a "deleted at" value for storing a global commit id of a delete transaction that deleted the shared read-only object. The second data structure comprises, for each of a plurality of secondary nodes, a global commit id that the secondary node is synchronized to. The third data structure comprises, for each of the plurality of shared read-only objects, an indication of which secondary nodes are reading which shared read-only objects. The fourth data structure comprises, for each of the plurality of shared read-only objects, a reference count indicating a number of active read transactions for the shared read-only object. The shared read-only objects that can be garbage collected can be identified using, at least in part, the first data structure, the second data structure, the third date structure, and the fourth data structure. The identified shared read-only objects can then be garbage collected.

DETAILED DESCRIPTION

Overview

The following description is directed to technologies for managing shared read-only objects in hybrid distributed database systems. For example, a number of data structures can be maintained (e.g., at a coordinator node and/or at secondary nodes) for managing the shared read-only objects and for more efficiently and safely performing garbage collection of the shared read-only objects. In some implementations, four data structures (e.g., four tables) are maintained for managing the shared read-only objects. The first data structure comprises, for each a plurality of shared read-only objects, a "deleted at" value for storing a global commit id of a delete transaction that deleted the shared read-only object. The second data structure comprises, for each of a plurality of secondary nodes, a global commit id that the secondary node is synchronized to. The third data structure comprises, for each of the plurality of shared read-only objects, an indication of which secondary nodes are reading which shared read-only objects. The fourth data structure (which is maintained local to each node) comprises, for each of the plurality of shared read-only objects, a reference count indicating a number of active read transactions for the shared read-only object. The shared read-only objects that can be garbage collected can be identified using, at least in part, the first data structure, the second data structure, the third date structure, and the fourth data structure. The identified shared read-only objects can then be garbage collected (e.g., including deleting them from the shared storage and deleting their entries from the various data structures).

Hybrid Architectures for Distributed Database Systems

Figure 1:
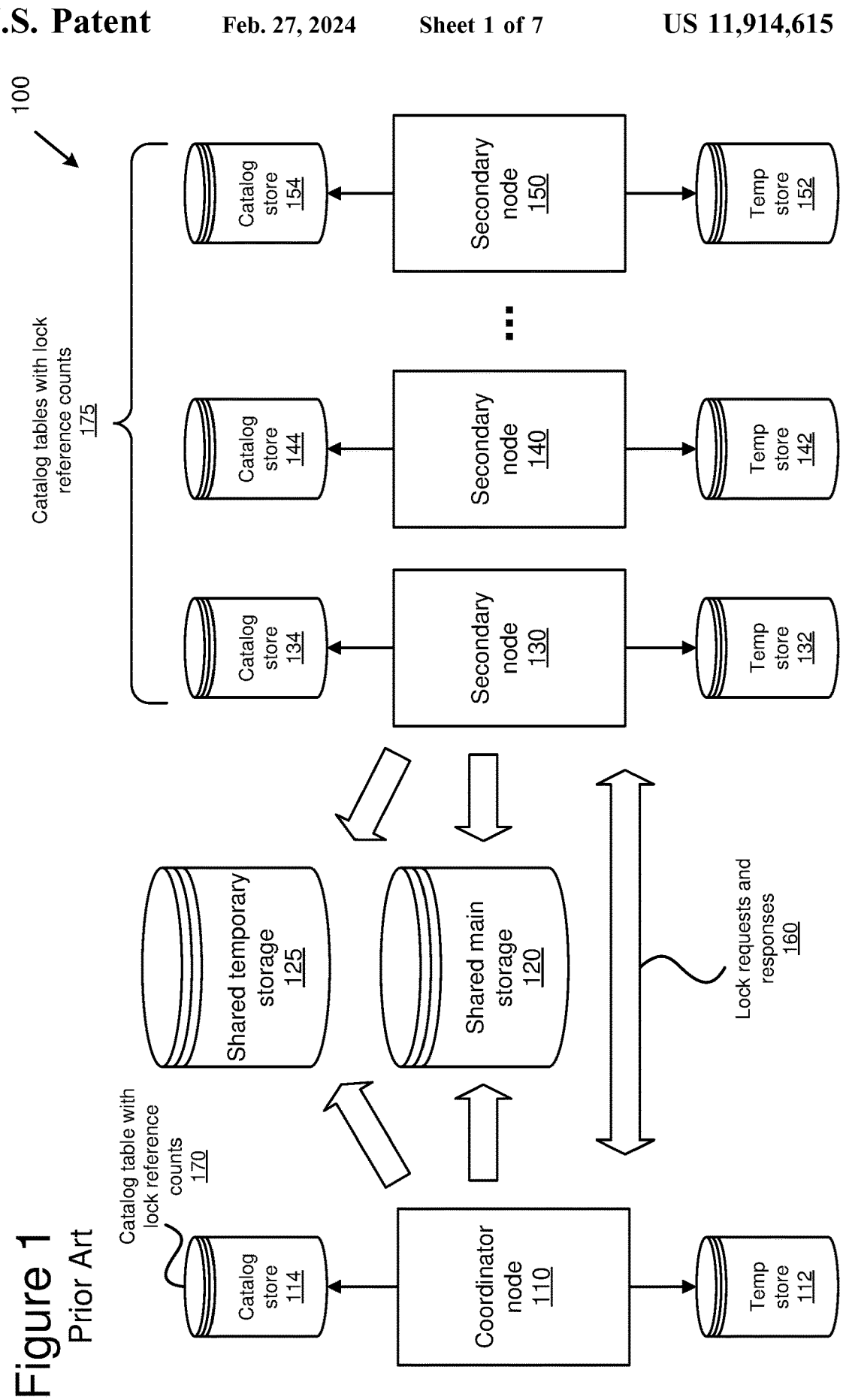
FIG. 1 is a diagram depicting an example hybrid distributed database environment that uses a prior art locking mechanism for shared objects.

FIG. 1 is a diagram depicting an example hybrid distributed database environment 100 that uses a prior art locking mechanism for shared objects. The example hybrid distributed database environment 100 includes a coordinator node 110 (also referred to as a coordinator server or just a coordinator). The coordinator node 110 runs software for performing global transaction management, data processing, and/or storage tasks, including management of the shared read-only objects. The coordinator node 110 runs on hardware resources (e.g., computing devices such as desktops or servers, virtual computing resources, cloud computing resources, etc.). The coordinator node 110 has local storage, including temp store 112 (e.g., storing temporary data) and catalog store 114 (e.g., storing catalog metadata and transaction logs). The coordinator node 110 also has access to shared storage, including shared main storage 120 and shared temporary storage 125. The shared storage, including the shared main storage 120 and the shared temporary storage 125, is used for shared permanent data and shared temporary data, and can be used for distributed query processing.

The example hybrid distributed database environment 100 includes multiple secondary nodes (also referred to as secondary servers), including secondary node 130, secondary node 140, and secondary node 150. The secondary nodes (e.g., secondary nodes 130, 140, and 150) run software for performing data processing and/or storage tasks, including management of the shared read-only objects. The secondary nodes run on hardware resources (e.g., computing devices such as desktops or servers, virtual computing resources, cloud computing resources, etc.). In general, the database environment can include any number of secondary nodes. The secondary nodes are each associated with local storage. For example, secondary node 130 is associated with temp store 132 and catalog store 134, secondary node 140 is associated with temp store 142 and catalog store 144, and secondary node 150 is associated with temp store 152 and catalog store 154. The temp store can store data such as temporary data and the catalog store can store data such as catalog metadata and transaction logs. The secondary nodes (e.g., secondary nodes 130, 140, and 150) also have access to the shared storage, including the shared main storage 120 and the shared temporary storage 125.

The coordinator node 110 manages global transactions and maintains the metadata for global resources and objects (such as tables) in its local catalog (e.g., in catalog store 114). The coordinator node 110 also maintains a clock, usually a monotonically increasing counter, as the source of transaction ids and commit ids for global transactions (e.g., for generating and assigning global commit ids).

Hybrid distributed database systems have a need to manage shared read-only objects (simply referred as shared objects herein). For example, such a shared object can be a file, a database table, or another type of data object. Shared objects are stored in shared storage. In the context of the hybrid distributed database environment 100, shared objects are stored in the shared main storage 120 and are accessible to the nodes of the database environment (e.g., to coordinator node 110 and to secondary nodes 130, 140, and 150). Shared objects can be created by transactions, referred to as create transactions, using resources (e.g., disk blocks) from the shared storage.

In hybrid distributed database systems, to read data from shared storage, a read operation on a node only needs the information in the local catalog of the node. In comparison, a write operation is different. To persist its modification, a write operation on a secondary node needs the coordinator node to do a global commit, committing the changed metadata in the main copy of the catalog at the coordinator node.

When a create transaction commits, it persists the metadata of the shared object in the database's catalog. For example, the coordinator node 110 can store the main copy of the catalog in the catalog store 114. The main copy of the catalog is synchronized from the coordinator node 110 to the secondary nodes 130, 140, and 150, and the secondary nodes 130, 140, and 150 store their copy of the catalog (stored in catalog store 134, 144, and 154, respectively). As a result of the create commit, the shared object become readable to other transactions (referred as read transactions). As an example, a database system may use a catalog table, referred as "shared objects", to store the metadata of shared objects in the catalog (e.g., stored in catalog store 114, 134, 144, and 154), and the catalog table may look like Table 1 below.

TABLE 1

Example shared objects

| Shared object name | Root block |
|---|---|
| "object1" | 1234 |
| "object2" | 5678 |

In the example depicted in Table 1, the database system persists only the block id of the root block of the shared object. Using the information in the root block, the database system can access the remaining blocks of the shared object. In other implementations, a different technique can be used to allocate shared objects using the shared storage and can persist different types of metadata in the catalog.

The changed main copy of the system's catalog (stored at the coordinator node) is synchronized to the secondary nodes. There are various techniques that can be used to synchronize the catalog. In one technique, the coordinator uses a network protocol to send the delta change to each secondary node. In another technique, the coordinator writes the delta change to a log in the shared storage. When a secondary node is to begin a new transaction, the secondary node checks if there are any new records in the log. If there are any new records, the secondary node replays the new records to update its own local catalog. Only after having replayed the new records, the secondary node begins the new transaction. In other words, a secondary node is trying to keep its local catalog synchronized with the main copy, but it does not have to keep its local catalog synchronized in order to perform operations.

A shared object can be deleted by a transaction, referred as a delete transaction. After the delete transaction is committed, the shared object will no longer be readable to new read attempts that start after the commit But the delete commit does not impact any ongoing read operations on the shared object that started before the commit After the commit of a deletion, the database system will release the resources (e.g., blocks of storage) used by the deleted shared object. This release operation is also referred to as garbage collection. As a common practice, the database system releases the resources only after the last read transaction has completed.

Due to the nature of hybrid distributed database systems, there are several challenges in the design and management of shared objects in the system. First, each node relies on its own local catalog to access shared objects, and each node runs at its own pace. Due to the delay in synchronization, the system cannot guarantee that the local catalog of a secondary node is always identical to that of the coordinator node, and secondary node's local catalog usually lags behind the coordinator's. For example, even after the coordinator node has already committed a delete of a shared object, from the perspective of a secondary node, that object is still readable according to its own local catalog. Without careful design, the coordinator node might garbage collect a shared object while a read transaction from a secondary node is reading that shared object. If that happens, then the read transaction will likely end up reading corrupted data.

Second, the nodes in a hybrid distributed database system can restart for various reasons (e.g., due to a manual restart or a crash). No matter which node restarts and how it restarts, such a restart should have as little impact on the rest of the database system as possible. Most importantly, such a restart should not break the integrity of the database, nor cause any resource leaks. For example, if the coordinator node restarts before it has a chance to release the resources of a deleted shared object, and if the coordinator node forgets to release the resources after it has restarted, then the resources will leak from the shared storage. If that happens, the database system will eventually run out of resources (e.g., run out of shared storage).

Third, network issues can happen in a hybrid distributed database system. Depending on its scope, a network issue may impact a single transaction, a single node, or several nodes. Depending on its duration, a network issue could be intermittent, or it could last long time. No matter the type of the network issue, a hybrid distributed database system is expected to maintain its availability as high as possible.

A common solution to the above challenges is to use a lock mechanism. As a simple example of a lock implementation, one new integer column, referred as "reference_count" is added to the shared objects catalog table. To read a shared object from a secondary node, the read transaction first needs to look in its local catalog to find the record of the shared object. If it cannot find the record, then the transaction will return an error to the end-user indicating that the shared object does not exist. If it can find the record, then the transaction sends a "lock" request to the coordinator node. Upon receipt of the "lock" request, the coordinator node looks in its local catalog to make sure the shared object still exists, then the coordinator node increments the reference count for the object, persists the changed "shared_objects" catalog table (which is synchronized to the secondary nodes), and replies success to the read transaction. The example hybrid distributed database environment 100 implements a locking mechanism for shared objects. As depicted at 160, lock requests and responses are exchanged between the coordinator node 110 and the secondary nodes 130, 140, and 150. The catalog stores store catalog tables with lock reference counts, as depicted at 170 and 175.

Once the success response is received, the read transaction can start to read the shared object. When the read transaction is finished reading, it sends an "unlock" request to the coordinator node. Upon receiving the "unlock" request, the coordinator node decrements the reference count for the object and persists the changed "shared_objects" catalog table (which is synchronized to the secondary nodes).

To delete a shared object, a delete transaction needs to send a "delete" request to the coordinator node. Upon receipt of the "delete" request, the coordinator node looks in its local "shared_objects" catalog table. If the shared object still exists, and if the reference count of the shared object is zero, then the coordinator deletes the record of the shared object from "shared_objects" catalog table, persists the changed "shared_objects" catalog table, replies success to the delete transaction, and garbage-collects the resources of the shared object from the shared storage.

While the above lock solution can be effective, it has several shortcomings. First, its performance is poor. For each read transaction, it needs to send two requests to the coordinator node to lock and unlock the corresponding shared object. At the coordinator node side, it must persist the changed reference count every time just in case a crash occurs. For example, if the coordinator node does not persist the reference count, a crash will cause the coordinator node to lose track of the locked shared objects. However, such persisting operations reduce performance and involve additional design complexity. For a delete transaction, the delete operation can succeed only when the shared object is not being read. For a database system where read operations are predominant, it may be common that the delete operation fails or must retry or wait (e.g., be blocked) for a significant amount of time.

Second, the lock solution has poor availability. In a hybrid distributed database system, the coordinator node may be down or not reachable due to various reasons, such as a server crash or network issues. If that happens, then none of the secondary nodes can initiate read operations on the shared objects, and thus the entire database system may be unavailable for read operations while the coordinator node is down.

Third, the lock solution is not robust. The coordinator node uses a reference count to track how many read transactions are reading a shared object. If a secondary node crashes while its read transactions are reading shared objects, then the corresponding shared objects will remain locked forever.

There are several techniques to mitigate the shortcomings in the above lock solution. In one technique, to reduce the overhead of "lock" and "unlock" requests, the secondary node maintains a local reference count for each shared object. Such a reference count counts how many read transactions on the node are currently reading the shared object. For each shared object, the secondary node only sends one "lock" request for its first read transaction. For each shared object, the secondary node only sends one "unlock" request for its last read transaction. This technique largely reduces the number of lock/unlock requests. However, the secondary node still needs such lock/unlock requests to prevent the coordinator node from garbage collecting the shared object which the secondary node is reading, and the coordinator node is still the single point of failure for read operations.

In another technique, to avoid retrying or blocking of delete requests, the "shared_objects" catalog table adds a Boolean flag column (referred as "deleted") for each shared object. To process a delete request, the coordinator node sets the "deleted" flag to TRUE and persists the change. The changed "shared_objects" catalog table will be synchronized to all secondary nodes. When a read transaction is to read a shared object, it needs to check that Boolean flag. A TRUE value for the flag indicates that the object is pending to be garbage collected from the database system, and the read transaction will return an error to the end user. Otherwise, the read transaction can obtain a lock and start to read the shared object. The coordinator node must persist the "deleted" flag in case it crashes before it can garbage collect the shared object. If the coordinator node does not persist the "deleted" flag, then the coordinator node will lose the information that the shared object is to be garbage collected after recovering from a crash.

In a third technique, the secondary node persists in its local catalog the records of its lock requests that the coordinator node has successfully accepted. When it unlocks a shared object successfully from the coordinator node, the secondary node deletes the corresponding lock record from its local catalog. The reason why the secondary node must persist its lock requests is for recovery purpose. If the node crashes after it locks a shared object, the node must unlock the object when it recovers. However, since an unlock operation involves the coordinator node and relies on the underlying network, the unlock might fail if any failure happens during this process, and then the recovery might fail as well.

These techniques to improve the lock solution can work together to improve the system's performance and robustness. However, they also significantly increase the complexity of the hybrid distributed database system and make it harder to analyze the correctness of the implementation.

Figure 2:
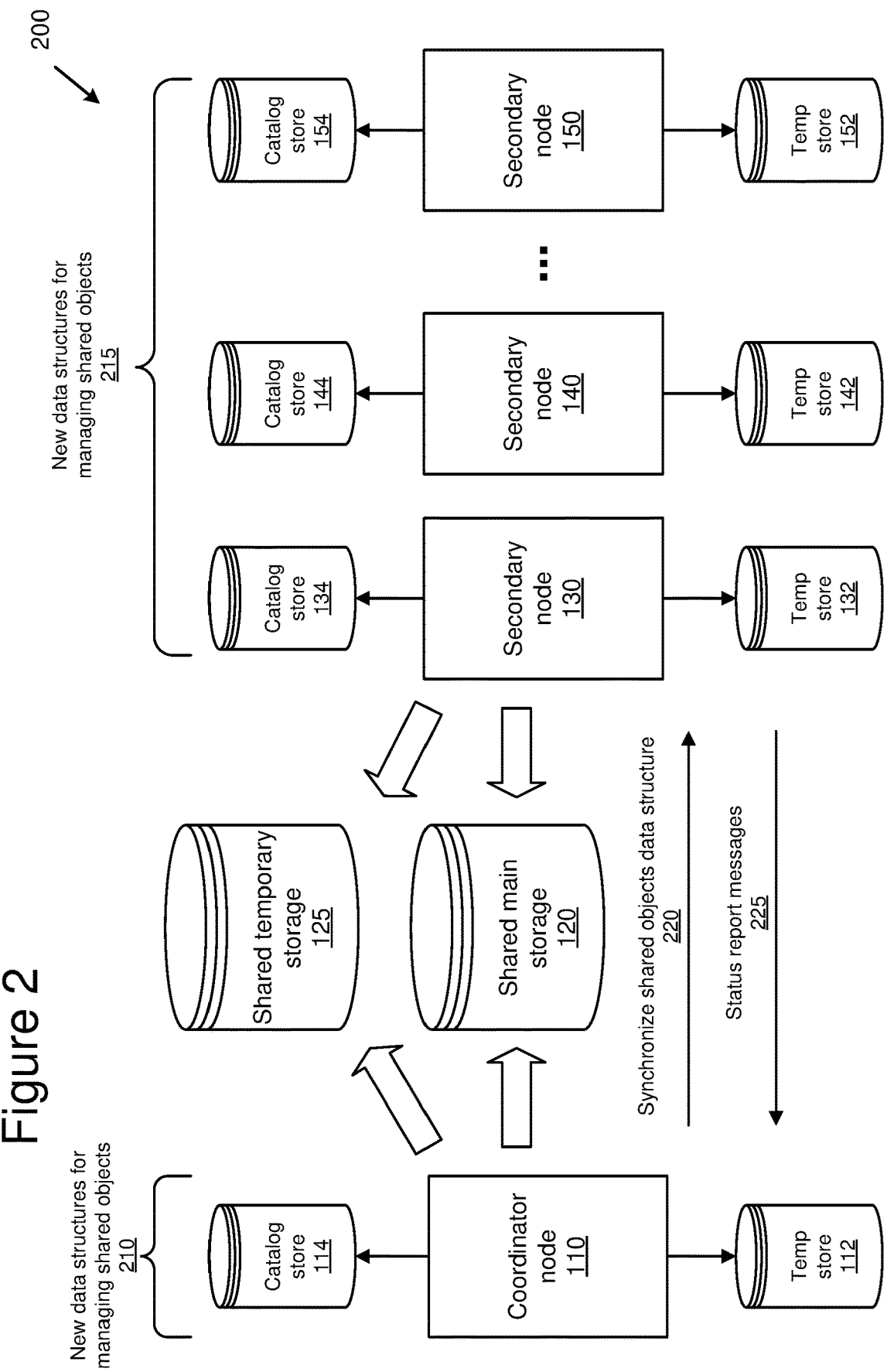
FIG. 2 is a diagram depicting an example hybrid distributed database environment that uses new techniques for managing shared read-only objects.

FIG. 2 is a diagram depicting an example hybrid distributed database environment 200 that uses new techniques for managing shared objects. Like with FIG. 1, the example hybrid distributed database environment 200 includes coordinator node 110, secondary nodes 130, 140, and 150, shared main storage 120, and the temp stores and catalog stores associated with the nodes. However, the example hybrid distributed database environment 200 uses new techniques for managing shared objects (e.g., managing read access and garbage collection for the shared objects), instead of using the described locking mechanism.

The new techniques for managing shared objects include new data structures (e.g., implemented using new tables in the catalog stores and/or stored in memory or other temporary storage). The new techniques can provide improved performance, improved reliability, and/or reduced complexity.

In a first new technique, a new column, referred as "deleted at", is added to the catalog table which the database system uses to manage shared read-only objects. This column saves the id of the global commit which requested to delete the corresponding shared object. A zero value of "deleted at" implies that the object is still readable. A non-zero value for "deleted at" implies that the shared object is pending to be garbage collected. If its local catalog table shows that a shared object has a non-zero "deleted at" value, then the node shall not allow new attempts to read it. Table 2 below depicts an example "shared objects" data structure that includes the "deleted at" value.

TABLE 2

Example shared objects data structure, including "deleted at" values

| Shared object name | Root block | Deleted at |
|---|---|---|
| "object1" | 1234 | 0 |
| "object2" | 5678 | 520 |
| "object3" | 9012 | 0 |

In Table 2, object1 and object 3 are still readable, while object2 is pending to be garbage collected as indicated by the "deleted at" value of 520 (the commit id of the corresponding delete request for object2). In other implementations, an indication other than a zero value could be used to indicate that an object is readable (i.e., that a delete request has not been processed for the object).

The "shared objects" data structure comprises, for each read-only shared object, an indication of the read-only shared object (e.g., a unique object identifier) and a "deleted at" value. The "deleted at" value stores a global commit id of a delete transaction that deleted the read-only shared object or, if the read-only shared object has not been deleted, an indication (e.g., a zero value) that the read-only shared object is still readable and has not been deleted. In some implementations, this data structure can comprise additional information, such as an indication of a storage location, or locations, of the shared object (e.g., root blocks and/or other indications of storage locations).

In some implementations, the "shared objects" data structure is stored by the coordinator node (e.g., stored by coordinator node 110 in catalog store 114, as part of the new data structures depicted at 210) and synchronized (e.g., as depicted at 220) to the secondary nodes (e.g., synchronized to secondary nodes 130, 140, and 150, and stored in their corresponding catalog stores, as part of the new data structures depicted at 215).

In a second new technique, a new data structure (referred to as "server status") is maintained that tracks the secondary nodes and the corresponding global commits that they report having synchronized up to. In some implementations, the "server status" data structure is an in-memory data structure that is maintained at the coordinator node (e.g., at coordinator node 110 as part of the new data structures depicted at 210). Table 3 below depicts an example "server status" data structure.

TABLE 3

Example server status data structure

| Server name | Global commit id |
|---|---|
| "secondary node 1" | 600 |
| "secondary node 2" | 610 |
| "secondary node 3" | 500 |

In Table 3, the database environment has three secondary nodes (e.g., corresponding to secondary nodes 130, 140, and 150), which are synchronized up to global commit ids 600, 610, and 500, respectively.

In a third new technique, a new data structure (referred to as "shared object usage") is maintained that tracks each shared object and the list of secondary nodes that have reported reading one or more of the shared objects. In some implementations, the "shared object usage" data structure is an in-memory data structure that is maintained at the coordinator node (e.g., at coordinator node 110 as part of the new data structures depicted at 210). Table 4 below depicts an example "shared object usage" data structure.

TABLE 4

Example shared object usage data structure

| Shared object name | Servers |
|---|---|
| "object1" | { } |
| "object2" | {"secondary node 1"} |
| "object3" | {"secondary node 2", "secondary node 3"} |

In Table 4, from the perspective of the coordinator node (e.g., coordinator node 110), none of the secondary nodes are reading object1, while secondary node 1 (e.g., secondary node 130) is readying object2, and both secondary nodes 2 and 3 (e.g., secondary nodes 140 and 150) are reading object3.

In some implementations, when the coordinator node starts, it initializes the shared object usage data structure to list all secondary nodes for each shared object. To illustrate how the initialization would work, if Table 4 was depicting the initialized data structure contents, then each object would list all three secondary nodes, {"secondary node 1", "secondary node 2", "secondary node 3"}. By listing all secondary nodes for each shared object, the coordinator node assumes that each shared object is being read by all secondary servers. Later, when the coordinator node receives a status report from a secondary node (e.g., as depicted at 225), the coordinator node will update the "shared object usage" data structure to reflect the actual usage by the secondary node (i.e., which shared objects the secondary node is actually reading). Performing this initialization process can ensure that the database environment is reliable (e.g., in the event of a crash recovery).

In a fourth new technique, a new data structure (referred to as "object reference count") is maintained that contains a count value for each shared object, each count value indicating the number of active read transactions that are reading the corresponding shared object. In some implementations, the "object reference count" data structure is maintained at, and specific to, each node in the database environment (e.g., at coordinator node 110 as part of the new data structures depicted at 210, and at secondary nodes 130, 140, and 150 as part of the new data structures depicted at 215). In other words, the "shared reference count" data structure for a given node contains the reference counts for the active read transactions of the given node. Table 5 below depicts an example "object reference count" data structure.

TABLE 5

Example object reference count data structure

| Shared object name | Reference count |
|---|---|
| "object1" | 0 |
| "object2" | 2 |
| "object3" | 5 |

For example, if the example "object reference count" data structure depicted in Table 5 is stored at secondary node 140, then the data structure would indicate that secondary node 140 has two read transactions reading object2 and five read transactions reading object3. Each node stores its own copy of the "object reference count" data structure that contains reference count values for read transactions of the node.

Managing shared objects using the new techniques described herein (e.g., the information stored in the new data structures) provides improvements over prior solutions (e.g., over locking solutions). For example, the new techniques provide improvements in terms of run time. With lock-based solutions, to read shared objects, the secondary node needs to communicate with the coordinator. Such communication not only increases performance overhead, but also introduces a single point of failure for read operations. Compared with lock-based solutions, the new techniques do not have the lock/unlock, and more importantly, do not have the problem of the single point of failure. Therefore, the new techniques improve the availability of the database system.

The new techniques also provide improvements in terms of recovery time. With lock-based solutions, when a secondary node recovers, it must unlock the shared objects that it had locked. Such unlock operations require communication with the coordinator. Therefore, the recovery process is not only time-consuming, but also prone to errors. Consequently, it reduces the reliability of the entire database system. With the new techniques, the secondary node just recovers itself as a standalone node, which results in a faster and more reliable recovery process.

The new techniques also provide improvements in terms of crash recovery. With lock-based solutions, to solve the conflict between read operations and garbage-collection, the coordinator uses a count to count the number of nodes reading a shared object. In order to handle restart of the coordinator itself, the coordinator needs to persist the count whenever the count changes. At the secondary node side, in order to handle a restart, the secondary node also needs to persist the number of its active read transactions for each shared object, and the node must unlock the locked objects during recovery. All these technical details significantly increase the complexity of the database system and make it harder to analyze whether the design is correct. In comparison, the new techniques only need to persist the commit id of the delete of a shared object. By comparing the delete commit id with the commit id that a secondary node is synchronized to, the coordinator would know clearly whether the secondary node has received the delete announcement or not, and thus it can reliably prevent a potential race condition between reading and garbage-collection from happening. Because the global commit id is a monotonically increasing value and will not be affected by a crash or restart of any node in the system, the new techniques for garbage-collection will work correctly no matter which node restarts or how it restarts. Therefore, the new techniques are less complex and provide improved robustness of the database system.

Example Management of Shared Objects

In the technologies described herein, shared read-only objects are managed within a hybrid distributed database environment. Management of shared read-only objects can include creating shared read-only objects, reading shared read-only objects, deleting shared read-only objects, and/or garbage collecting shared read-only objects.

To create a shared object, a create transaction allocates resource (e.g., storage blocks) for the shared object from the shared storage (e.g., from shared main storage 120). The create transaction then sends a "create" request to the coordinator (e.g., to coordinator node 110). The create request includes metadata for the shared object. In some implementations, the metadata comprises the block id of the root block of the shared object (e.g., as depicted in Table 2). Upon receipt of the create request, the coordinator validates the create request. If the validation is successful, then the coordinator performs a global commit to commit the create request. In some implementations, the global commit of a create request is performed according to the following operations:

Assign a global commit id for the commit (the global commit id is monotonically increasing, and can be used to strictly map database events onto a timeline according to their sequence).

Insert a record for the new shared object in the "shared objects" data structure (e.g., as depicted in Table 2). Set the "deleted at" value in the data structure for the new shared object to a value indicating that the new shared object can be read and has not been deleted (e.g., to a value of zero).

Persist the changed "shared objects" data structure. For example, the data structure can be persisted in the catalog store 114 as part of the new data structures depicted at 210.

Add an entry in the "shared object usage" data structure (e.g., as depicted in Table 4) for the shared object, and include all secondary nodes in "servers" field for the shared object.

Add an entry in the "object reference count" data structure (e.g., as depicted in Table 5) for the shared object, and set its reference count to zero.

The changed "shared objects" data structure will be synchronized to the secondary nodes. For example, the data structure will be synchronized to secondary nodes 130, 140, and 150.

To illustrate how the various data structures are updated when a new shared object is created, consider an example in which a shared object named "object4" is created. After the create request is received and committed, the "shared objects" data structure can be updated as depicted below in Table 6 to include an entry for "object4" along with its root block and a deleted at value of zero.

TABLE 6

Shared objects data structure with added object4

| Shared object name | Root block | Deleted at |
|---|---|---|
| "object1" | 1234 | 0 |
| "object2" | 5678 | 520 |
| "object3" | 9012 | 0 |
| "object4" | 2345 | 0 |

The "shared object usage" data structure can be updated as depicted in Table 7 to include an entry for "object4" and the "servers" field can be initialized with each secondary node (in this example, there are three secondary nodes).

TABLE 7

Shared object usage data structure with added object4

| Shared object name | Servers |
|---|---|
| "object1" | { } |
| "object2" | {"secondary node 1"} |
| "object3" | {"secondary node 2", "secondary node 3"} |
| "object4" | {"secondary node 1", "secondary node 2", "secondary node 3"} |

The "object reference count" data structure can be updated as depicted in Table 8 to include an entry for "object4" and the "reference count" field can be set to zero.

TABLE 8

Object reference count data structure with added object4

| Shared object name | Reference count |
|---|---|
| "object1" | 0 |
| "object2" | 2 |
| "object3" | 5 |
| "object4" | 0 |

To read a shared object, the read transaction looks up the shared object in its local "shared objects" data structure (in typical implementations, each node, whether the coordinator node or one of the secondary nodes, maintains a local copy of the "shared objects" data structure, and the read transaction can be performed at any of the nodes). If the shared object is not found in the data structure, or if the "deleted at" value of the shared object is not zero, then the read transaction will fail (e.g., return an error to end-user). Otherwise, the read transaction will succeed and increment the reference count value in the "reference count" field of the "object reference count" data structure for the shared object and then start to read. When the read transaction has finished reading, it will decrement the reference count value in the "reference count" field for the shared object.

To delete a shared object, the delete transaction sends a "delete" request to the coordinator node (e.g., to coordinator node 110). If the shared object still exists and is not pending to be garbage-collected (e.g., if the shared object is present in the "shared objects" data structure and its "deleted at" value is zero), then the coordinator node will perform a global commit to commit the delete request. In some implementations, the global commit of the delete request performs the following operations:

Assign a global commit id.
Update the "deleted at" value to the global commit id for the shared object in the "shared objects" data structure.
Persist the updated "shared objects" data structure (e.g., in catalog store 114 of coordinator node 110 as part of the new data structures depicted at 210);
The updated "shared objects" data structure will be synchronized to the secondary nodes (e.g., synchronized to, and stored by, secondary nodes 130, 140, and 150 as part of the new data structures depicted at 215).

To illustrate how a shared object is deleted, suppose "object1" is committed to be deleted and the global commit id is 700. After the commit, the "shared objects" data structure at the coordinator node may appear as depicted in Table 9.

TABLE 9

Shared objects data structure depicting deleted object1

| Shared object name | Root block | Deleted at |
|---|---|---|
| "object1" | 1234 | 700 |
| "object2" | 5678 | 520 |
| "object3" | 9012 | 0 |
| "object4" | 2345 | 0 |

When the database environment synchronizes the "shared objects" data structure from the coordinator node to the secondary nodes, it also tells the secondary nodes which global commit changed the "shared objects" data structure, and each secondary node persists the id of the global commit in its own local catalog. For example, if "secondary node 2" has synchronized to global commit 700, then its "shared objects" data structure will be identical to the coordinator node's version that was updated by commit 700. And, "secondary node 2" will also record 700 in its local catalog.

Periodically, the secondary nodes report their status to the coordinator node. In this report, a secondary node reports the following information (e.g., as part of a status report message):

The id of the latest global commit id that the secondary node has synchronized up to.
A list of the shared objects that are being read by read transactions at the secondary node. This list can be determined by the "object reference count" data structure at the secondary node. For example, a status report form "secondary node 2" may look like: (700, {"object1", "object4"}), indicating that "secondary node 2" has synchronized to commit 700 and is reading "object1" and "object4".

Upon receipt of a status report from a secondary node, the coordinator node updates both the "server status" data structure and the "shared object usage" data structure according to the status report. As an example, after receiving the above status report from "secondary node 2", the coordinator node could update its data structures as depicted in Tables 10 (adding "secondary node 2" to "object 1", removing "secondary node 2" from "object 3", and retaining "secondary node 2" for "object4") and 11 (updating the global commit id to 700 for "secondary node 2") below.

TABLE 10

Shared object usage data structure updated by status report

| Shared object name | Servers |
|---|---|
| "object1" | {"secondary node 2"} |
| "object2" | {"secondary node 1"} |
| "object3" | {"secondary node 3"} |
| "object4" | {"secondary node 1", "secondary node 2", "secondary node 3"} |

TABLE 11

Server status data structure updated by status report

| Server name | Global commit id |
|---|---|
| "secondary node 1" | 600 |
| "secondary node 2" | 700 |
| "secondary node 3" | 500 |

Figure 3:
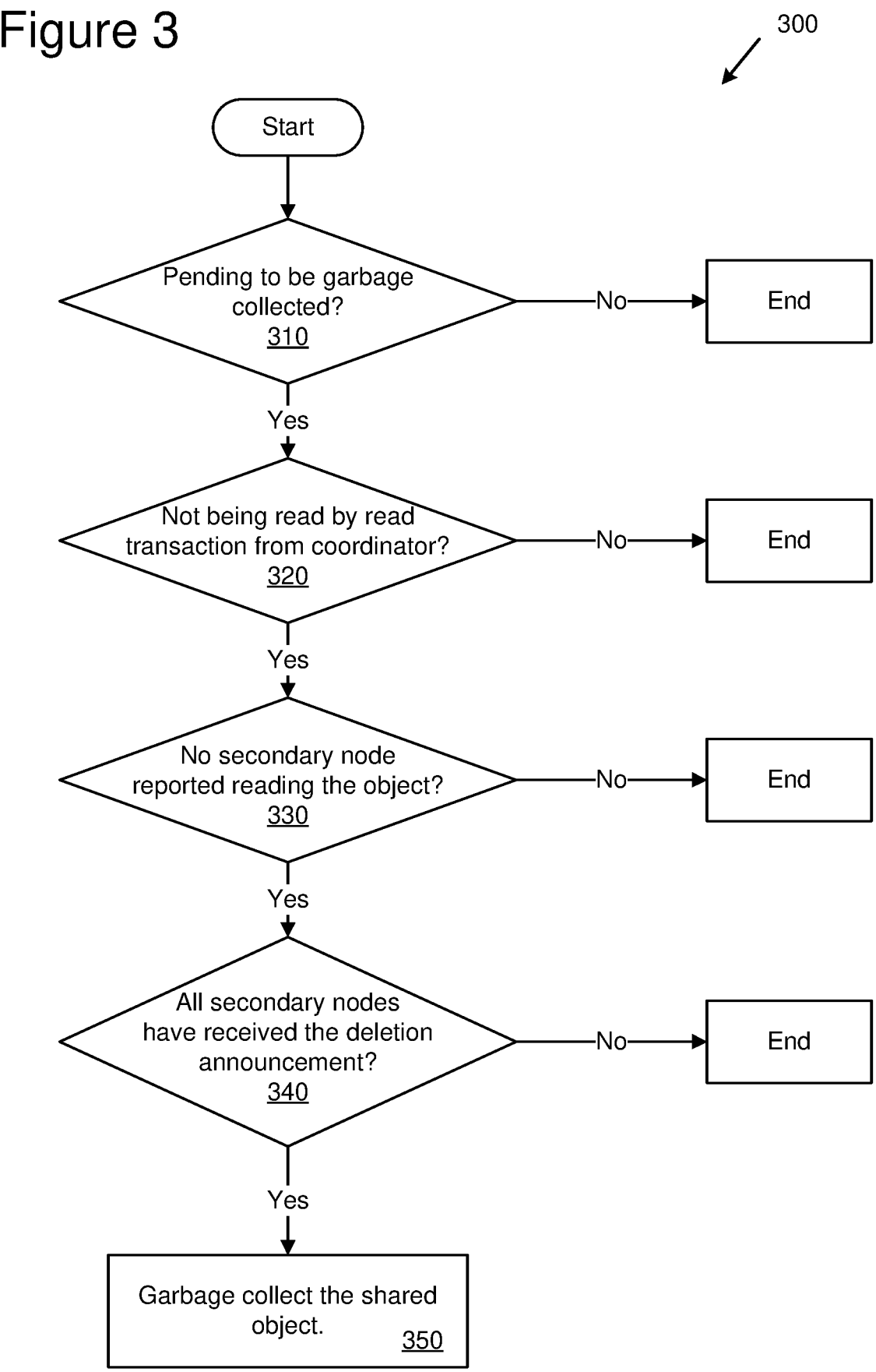
FIG. 3 is a flowchart of an example process for identifying which shared read-only objects can be garbage collected.

To garbage-collect deleted shared objects, the coordinator node uses the information from its "shared objects" data structure (e.g., stored as a catalog table) and its "server status", "shared object usage", and "object reference count" data structures (e.g., stored as in-memory data structures), and follows a set of garbage-collection rules to determine whether a shared object can be safely garbage-collected or not. The coordinator node can perform garbage collection on a periodic basis, or based on some other trigger (e.g., upon receiving a status report message), to determine which shared objects can be garbage collected. In some implementations, garbage collection is performed according to the following rules. These rules are also reflected in FIG. 3, which is a flowchart of an example process 300 for identifying which shared objects can be garbage collected.

If the "deleted at" value of the shared object is zero, then this shared object shall be retained (i.e., not garbage collected) because this shared object is still readable. This rule corresponds to decision 310. When the shared object is not pending to be garbage collected (e.g., "deleted at" value of zero), then the "no" branch is followed and the shared object is not garbage collected.

Otherwise, if the "reference count" value of the shared object from the "object reference count" data structure is not zero, then this shared object shall be retained because there is still an active read transaction at the coordinator node that is reading the shared object. This rule corresponds to decision 320.

Otherwise, if the "servers" field of the "shared object usage" data structure is not empty, then this shared object shall be retained. This rule corresponds to decision 330. From the perspective of the coordinator node, when the "servers" field is not empty, there is at least one secondary node that is reading the shared object.

Otherwise, if the "global commit id" value of any of the secondary nodes in the "server status" data structure is less than the "deleted at" value of the shared object (from the "shared objects" data structure), then the shared object shall be retained. This rule corresponds to decision 340. From the perspective of the coordinator node, upon reaching this rule the shared object is pending to be garbage-collected and no server has reported reading the shared object. However, the coordinator node also knows (when the "global commit id" value of any secondary node is less than the "deleted at" value) that that the secondary nodes have not all received the delete announcement. From the perspective of the secondary nodes, the shared object is still readable, and they would still allow new attempts to read the shared object. If the coordinator node garbage-collects the shared object at this moment, a new read transaction at one of the secondary nodes may have just started to read the shared object, and the new read transaction will likely read corrupted data. Therefore, the coordinator node shall retain the shared object for now.

Otherwise, the shared object can be garbage-collected. This rule corresponds to operation 350. Upon reaching this rule, from the perspective of the coordinator node, all secondary servers known that the shared object is pending to be garbage-collected (if this rule is reached, then all secondary nodes have synchronized to at least the global commit id of the delete request). No secondary node would allow a new read attempt to happen at this point (the secondary nodes have synchronized their "shared objects" data structure and know that the shared object has been deleted). Because all nodes have reported not reading the object, it is safe for the coordinator node to garbage-collect the shared object.

After garbage collecting the resources occupied by the shared object from the shared storage, the coordinator node will perform a global commit. In some implementations, the global commit comprises the following operations.

Assign a global commit id.

Delete the record of the object from "shared objects" data structure.

Persist the updated "shared objects" data structure.

Delete the entries of the shared object from the coordinator node's other data structures (e.g., "server status", "shared object usage", and "object reference count").

The updated "shared objects" data structure will be synchronized to the secondary nodes.

When a secondary node synchronizes its local "shared objects" data structure (e.g., stored in its local catalog store), it will notice that some shared objects have been removed from the "shared objects" data structure by the coordinator node. Then, the secondary node will update its "object reference count" data structure to remove the entries for those garbage-collected shared objects.

Example High Availability Scenarios

This section illustrates how the technologies described herein can be applied to achieve improvements in the availability and scalability of the database system. For example, the availability of the database system can be improved by designating a failover node that can take over the role of the coordinator node if the coordinator node fails. Scalability can be improved by adding or dropping a secondary node without impacting ongoing workloads on the other nodes.

In some implementations, the coordinator node stops and restarts as follows. When the coordinator stops, ongoing reading of shared objects from all secondary nodes can proceed uninterrupted. New read attempts from all secondary nodes can also be processed. Of course, creation and deletion of shared objects will fail because they need the coordinator to perform a global commit. When the coordinator restarts, it will initialize "server status," "shared object usage," and "object reference count" data structures because these data structures are in-memory data structures. The coordinator does not need to initialize "shared objects" because that data structure is persisted in the local catalog. For the "server status" data structure, the global commit id of each secondary node is set to zero as if the node was just added. For the "shared object usage" data structure, all secondary nodes are added for each shared object as if each shared object is being read by all secondary nodes. For the "object reference count" data structure, a reference count value of zero is set for each shared object (because the coordinator has just restarted, and it has no read transactions yet). When the coordinator receives a status report from a secondary node, it will update the data structures to reflect the reported status.

If a secondary node stops and restarts, the secondary node just needs to resume sending its status report to the coordinator. From the perspective of the coordinator, it may not detect that the secondary node had stopped and restarted. Of course, if a secondary node is down for a long time, the coordinator must retain the shared objects that had been deleted after the global commit that the secondary node has synchronized to. If the secondary node is unable to return to service, action can be taken to drop the secondary node from the system When a new secondary node is added into the system, the coordinator needs to add the new secondary node for each shared object in the "shared object usage" data structure. The coordinator also needs to add the new secondary node to the "server status" data structure and set zero for the global commit id that the secondary node is synchronized to.

When a secondary node is dropped from the system, the coordinator removes the secondary node from the "shared object usage" and "server status" data structures.

When the coordinator (referred to as the original coordinator) fails and a designated failover node (referred as the new coordinator) takes over the role of the original coordinator, the new coordinator makes sure its local catalog has been synchronized with that of the original coordinator. Then, the new coordinator initializes its "server status," "shared object usage," and "object reference count" data structures (the same way as a normal coordinator would do during a restart).

Example Garbage Collection Scenario

Figure 4:
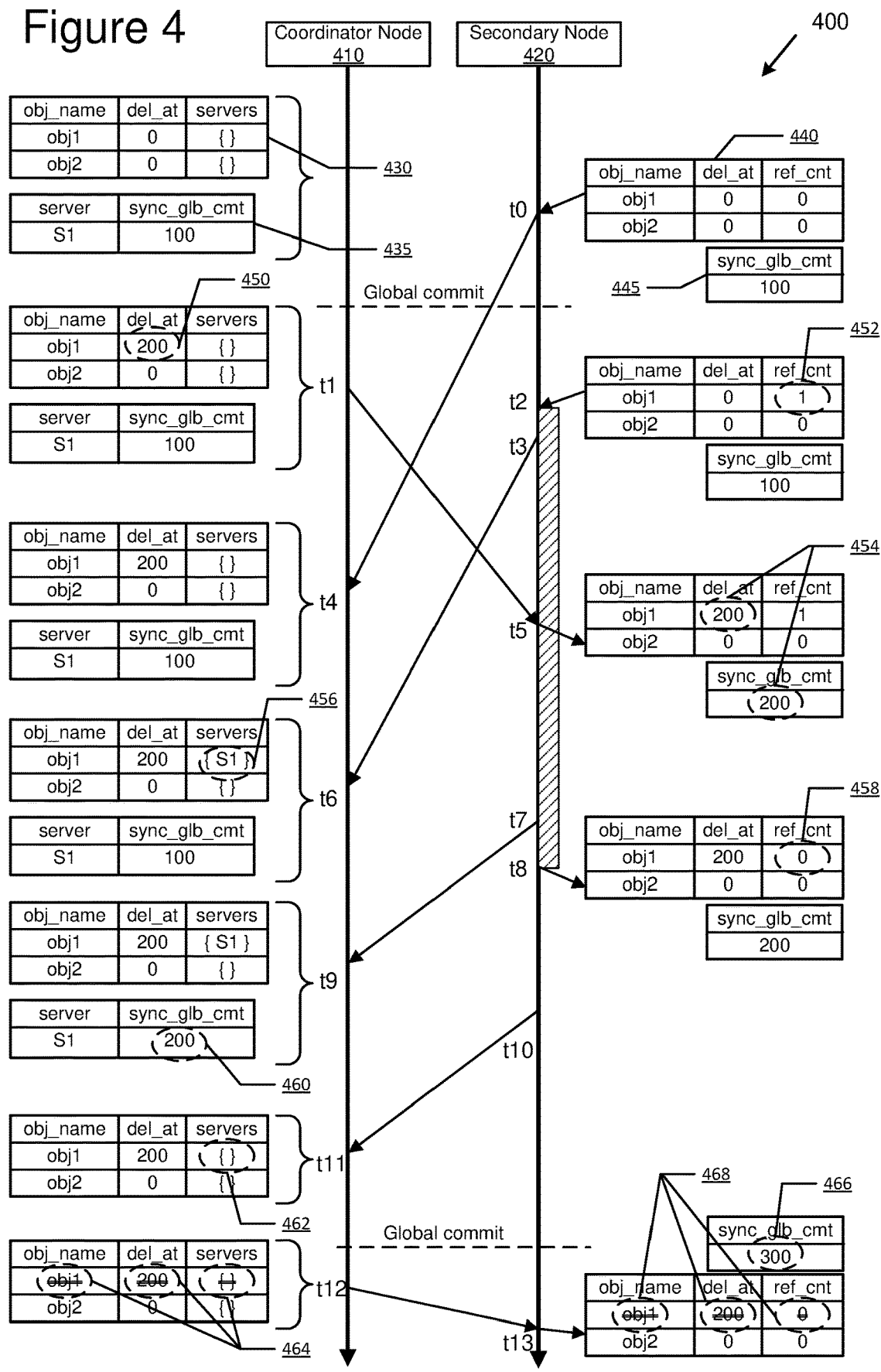
FIG. 4 is a diagram depicting an example garbage collection scenario.

This section illustrates how the various data structures are utilized and updated during an example garbage collection scenario. The example garbage collection scenario 400 is illustrated with reference to FIG. 4. The example garbage collection scenario 400 involves two nodes, a coordinator node 410 (e.g., which could correspond to coordinator node 110) and a secondary node 420 (e.g., which could correspond to one of secondary nodes 130, 140, or 150). Initially, as depicted at 430, the database environment has two shared objects, referred to as "obj1" and obj2". The two shared objects have not been deleted ("del_at" is 0) and, from the point of view of the coordinator node, they are not being read by any nodes (the "servers" field is empty for both). The table depicted at 430 is a summary of the information from the "shared objects" data structure (the object name and the deleted at value) and from the "shared object usage" data structure (the servers field). Also, as depicted at 435, secondary node 420 (referred to in this example as "S1") has synchronized up to global commit id (sync_glb_cmt) 100. The table depicted at 435 comes from the "server status" data structure.

The example garbage collection scenario 400 proceeds to time t0. At time t0, the data stored at the secondary node 420 is summarized in the table depicted at 440 (a summary of the information from the "shared objects" data structure and the "object reference count" data structure) and the table depicted at 445 (the global commit that the secondary node 420 is synchronized to). At time t0, the secondary node 420 sends status report message, (100, { }), to the coordinator node 410, which indicates that the secondary node 420 has synchronized its data structures to global commit id 100 and is not reading any shared objects. The status report message is received by the coordinator node 410 at time t4, which will be discussed below.

The example garbage collection scenario 400 proceeds to time t1. At time t1, the coordinator node 410 performs a global commit (with a global commit id of 200) to delete the shared object "obj1", which updates the deleted at value to 200 as depicted at 450. Synchronization of the "shared objects" data structure begins to secondary node 420.

The example garbage collection scenario 400 proceeds to time t2. At time t2, a read transaction begins at the secondary node 420 to read shared object "obj1". As a result, the local reference count value is increased to "1" as depicted at 452. It should be understood that at time t2 "obj1" was still readable by the secondary node 420 due to the local data structures even though "obj1" was marked as deleted at the coordinator node 410 at time t1 (which has not yet synchronized to the secondary node 420).

The example garbage collection scenario 400 proceeds to time t3. At time t3, the secondary node 420 reports its status, (100, {obj1}), which indicates that the secondary node 420 has synchronized its data structures to global commit id 100 and is reading "obj1".

The example garbage collection scenario 400 proceeds to time t4. At time t4, the coordinator node 410 receives the status report message sent by the secondary node 420 at t0. At this time, the coordinator node 410 cannot garbage collect "obj1" because the secondary node 420 has only synchronized up to global commit id 100 (which is less than the deleted at value of 200), so the coordinator node 410 retains "obj1" for now.

The example garbage collection scenario 400 proceeds to time t5. At time t5, the secondary node 420 has synchronized its local data structures to global commit id 200 and has recorded the global commit id, as depicted at 454. At this time, from the perspective of the secondary node 420, "obj1" is no longer readable to new read attempts. However, the ongoing read of "obj1" will continue.

The example garbage collection scenario 400 proceeds to time t6. At time t6, the coordinator node 410 receives the status report message that the secondary node 420 sent at t3. At this time, the coordinator node 410 knows that the secondary node 420 was reading "obj1" and the secondary node 410 was lagging behind global commit id 200. At this time, the coordinator node 410 cannot garbage collect "obj1" because "obj1" is still being read by the secondary node 420.

The example garbage collection scenario 400 proceeds to time t7. At time t7, the secondary node 420 sends a status report message, (200, {obj1}), indicating that it has synchronized to global commit id 200 and is reading "obj1".

The example garbage collection scenario 400 proceeds to time t8. At time t8, the read transaction at the secondary node 420 finishes reading "obj1". The secondary node 420 decrements its local reference count (from 1 to 0) for "obj1" as depicted at 458.

The example garbage collection scenario 400 proceeds to time t9. At time t9, the coordinator node 410 receives the status report message sent by the secondary node 420 at t7. At this time, the coordinator node 410 knows that the secondary node 420 has synchronized to global commit id 200 and was still reading "obj1" and updates its local data structure, as depicted at 460. At this time, from the perspective of the coordinator node 410, the coordinator node 410 cannot garbage collect "obj1" because "obj1" is still being read by the secondary node 420.

The example garbage collection scenario 400 proceeds to time t10. At time t10, the secondary node 420 sends a status report message, (200, { }), indicating that it has synchronized to global commit id 200 and is not reading any shared objects.

The example garbage collection scenario 400 proceeds to time t11. At time t11, the coordinator node 410 receives the status report message sent by the secondary node 420 at t10. At this time, the coordinator node 410 knows that the secondary node 420 is no longer reading "obj1" and updates its local data structure as depicted at 462. Furthermore because the secondary node 410 has synchronized to global commit id 200 (which happened at time t9), the coordinator node 410 knows that the secondary node 420 cannot read "obj1" again.

The example garbage collection scenario 400 proceeds to time t12. At time t12, the coordinator node 410 proceeds to garbage collect "obj1" and commits the change in global commit id 300. During the garbage collection, the coordinator node 410 removes "obj1" from its data structures, as depicted at 464. Synchronization of the "shared objects" data structure begins to secondary node 420.

The example garbage collection scenario 400 proceeds to time t13. At time t13, the secondary node 420 synchronizes its local data structures to global commit id 300, as depicted at 466. The secondary node 420 also removes "obj1" from its local data structures, as depicted at 468.

Methods for Managing Shared Read-Only Objects

In the technologies described herein, methods can be provided for managing shared read-only objects in in a database environment (e.g., in a hybrid distributed database system). The example methods can be implemented using software and/or hardware resources. For example, the methods can be implemented by one or more elements of a distributed database environment, such as by a coordinator node (e.g., by coordinator node 110).

Figure 5:
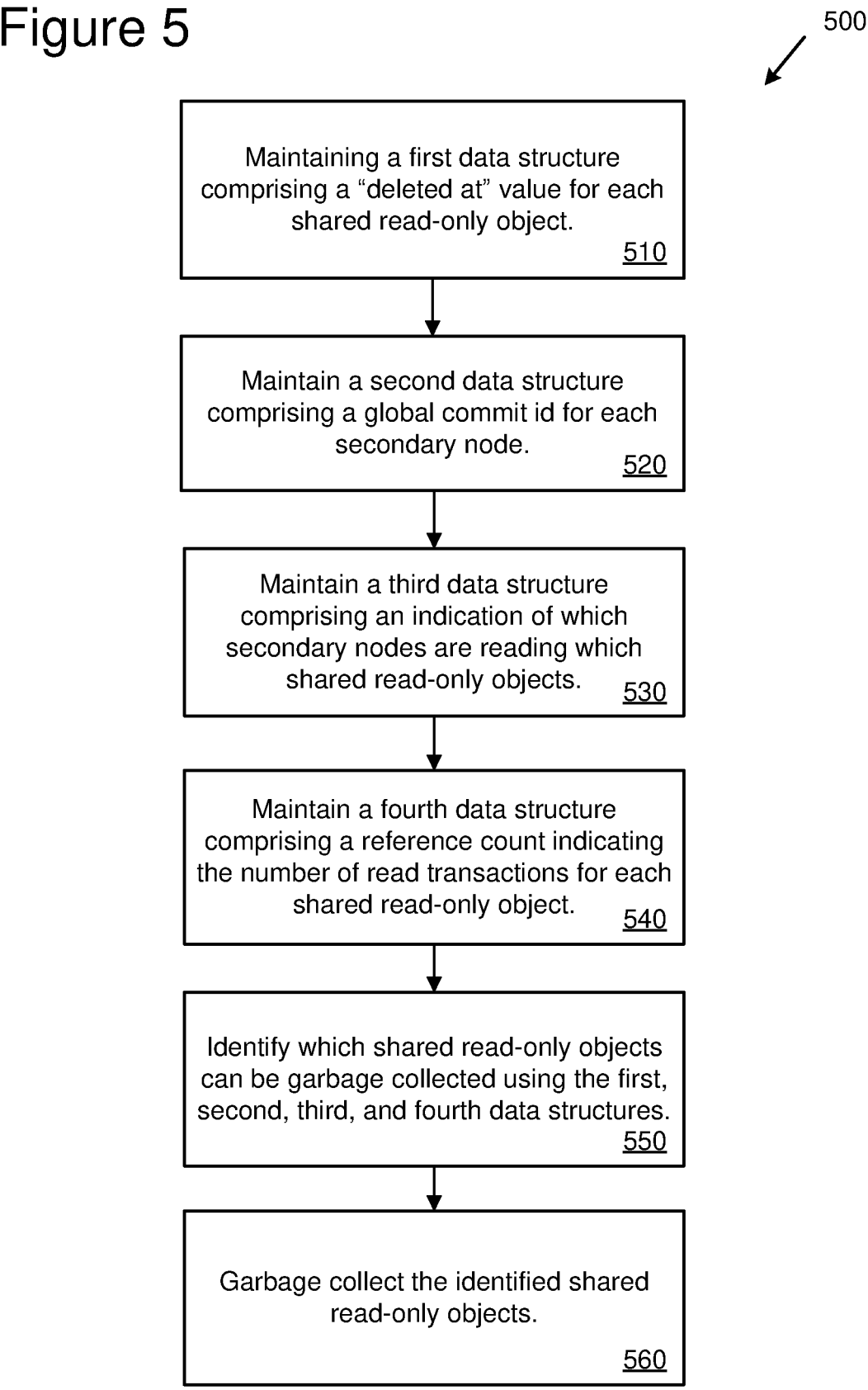
FIG. 5 is a flowchart of an example process for managing shared read-only objects in a hybrid distributed database system.

FIG. 5 is a flowchart of an example process 500 for managing shared read-only objects in a hybrid distributed database system. For example, the example process 500 can be performed by a node (e.g., a server) within a database environment, such as by coordinator node 120.

At 510, a first data structure is maintained. The first data structure comprises a "deleted at" value for each shared read-only object. The "deleted at" value stores a global commit id of a delete transaction that deletes the shared read-only object. If a given shared read-only object has not been deleted and is therefore available to read by new read attempts, then the "deleted at" value indicates so (e.g., by storing a value of zero), At 520, a second data structure is maintained. The second data structure comprises a global commit id for each secondary node, which is the global commit id that the secondary node is synchronized to. In some implementations, this data structure is stored at a coordinator node and updated upon receiving status report messages from the secondary nodes.

At 530, a third data structure is maintained. The third data structure comprises an indication of which secondary nodes are reading which shared read-only objects. In some implementations, this data structure is stored at a coordinator node and updated upon receiving status report messages from the secondary nodes.

At 540, a fourth data structure is maintained. The fourth data structure comprises a reference count indicating the number of read transactions for each shared read-only object, which indicates the number of active read transactions for each shared read-only object on a per-node basis.

At 550, the shared read-only objects that can be garbage collected are identified using, at least in part, the first data structure, the second data structure, the third data structure, and the fourth data structure. For example, a number of garbage collection rules can be applied in an evaluation order to identify which (if any) of the shared read-only objects can be garbage collected.

At 560, the shared read-only objects that were identified at 550, if any, are garbage collected. For example, garbage collection can comprise freeing the storage resources (e.g., storage blocks) associated with the identified shared read-only objects, deleting records associated with the identified shared read-only objects from one or more of the data structures, and/or synchronizing one or more of the updated data structures (e.g., to secondary nodes).

Figure 6:
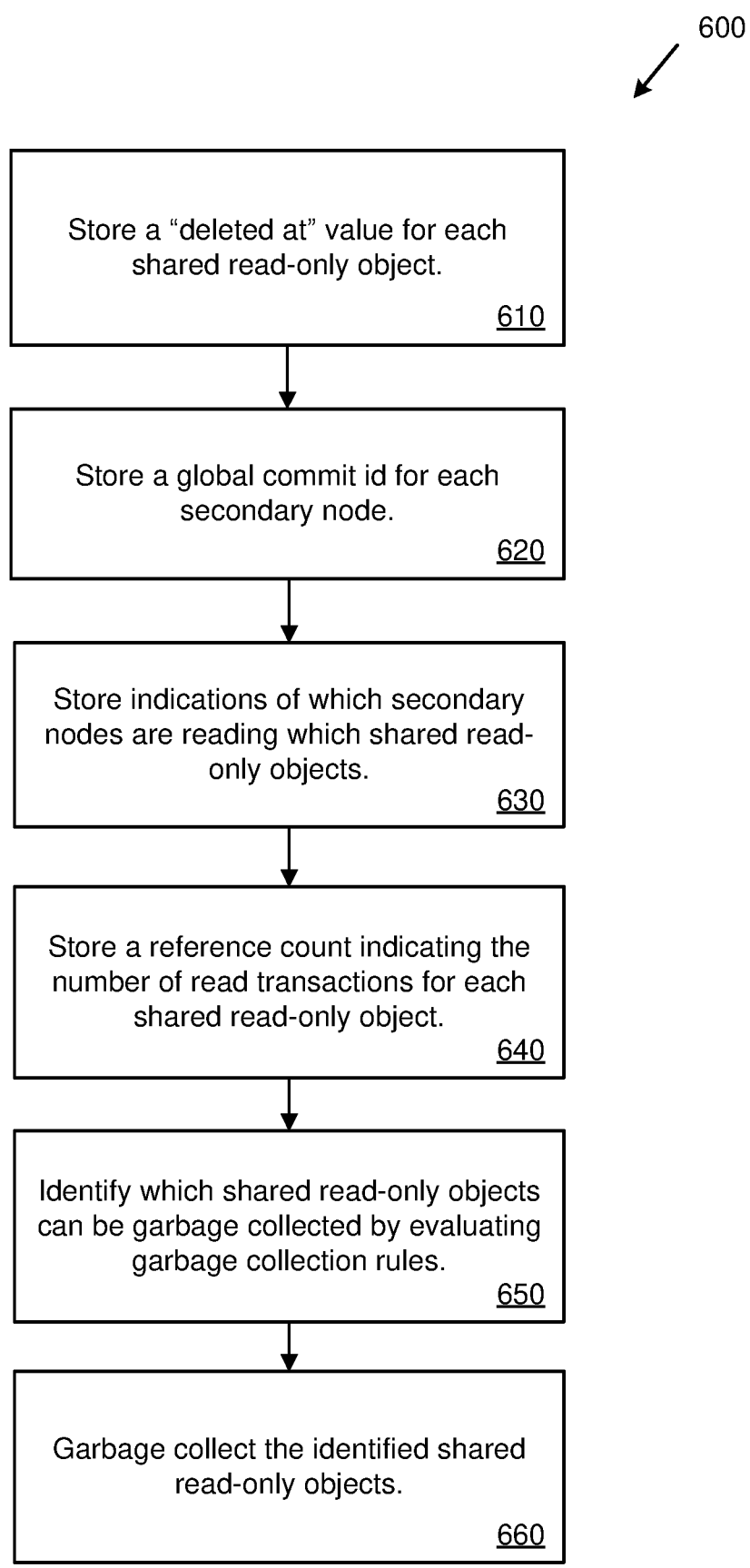
FIG. 6 is a flowchart of an example process for managing shared read-only objects in a hybrid distributed database system, including evaluating garbage collection rules.

FIG. 6 is a flowchart of an example process 600 for managing shared read-only objects in a hybrid distributed database system, including evaluating garbage collection rules. For example, the example process 600 can be performed by a node (e.g., a server) within a database environment, such as by coordinator node 120.

At 610, a "deleted at" value is stored for each shared read-only object. The "deleted at" value stores a global commit id of a delete transaction that deletes the shared read-only object. If a given shared read-only object has not been deleted and is therefore available to read by new read attempts, then the "deleted at" value indicates so (e.g., by storing a value of zero), At 620, a global commit id is stored for each secondary node, which is the global commit id that the secondary node is synchronized to. In some implementations, the global commit id values are stored at a coordinator node and updated upon receiving status report messages from the secondary nodes.

At 630, indications are stored that indicate which secondary nodes are reading which shared read-only objects. In some implementations, the indications are stored at a coordinator node and updated upon receiving status report messages from the secondary nodes.

At 640, a reference count is stored indicating the number of read transactions for each shared read-only object, which indicates the number of active read transactions for each shared read-only object. For example, if the example process 600 is performed by a coordinator node, then the reference count indicates the number of active read transactions of the coordinator node for each shared read-only object. More generally, each node can store its own reference counts for its local active read transactions.

At 650, the shared read-only objects that can be garbage collected are identified by evaluating garbage collection rules. For example, a number of garbage collection rules can be applied in an evaluation order to identify which (if any) of the shared read-only objects can be garbage collected.

At 660, the shared read-only objects that were identified at 650, if any, are garbage collected. For example, garbage collection can comprise freeing the storage resources (e.g., storage blocks) associated with the identified shared read-only objects, deleting stored information (e.g., stored in data structures) associated with the identified shared read-only objects from, and/or synchronizing updated information (e.g., to secondary nodes).

Computing Systems

Figure 7:
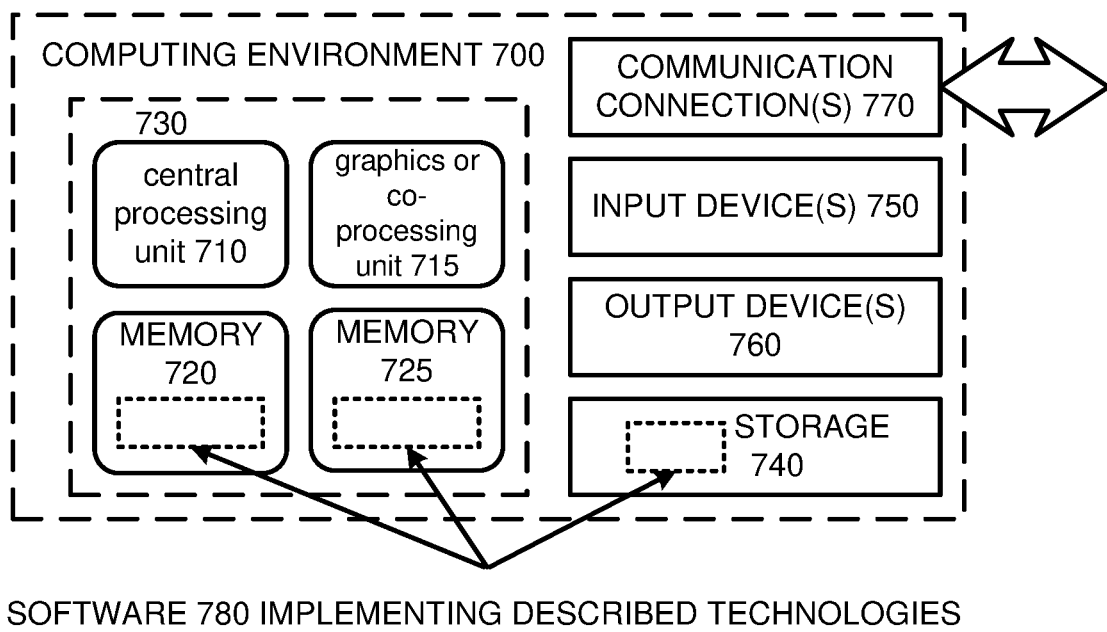
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
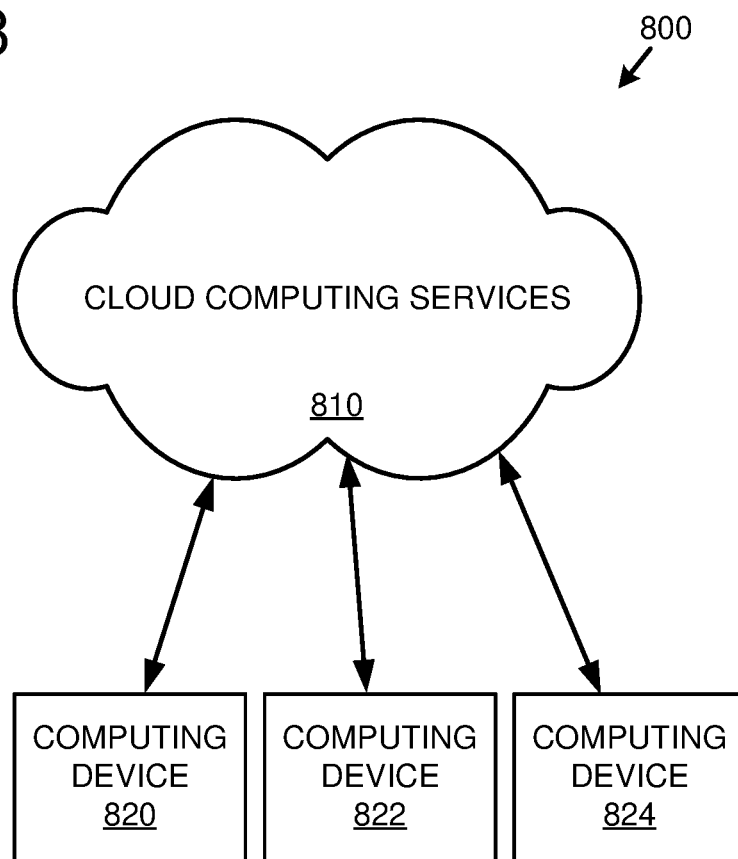
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for managing shared read-only objects in a hybrid distributed database system, the method comprising:
maintaining a first data structure comprising, for each of a plurality of shared read-only objects, a "deleted at" value for storing a first global commit id of a delete transaction that deleted the shared read-only object, the delete transaction including a performance of a global commit to commit a received request to delete the shared read-only object;
maintaining a second data structure comprising, for each of a plurality of secondary nodes, a respective second global commit id that the secondary node is synchronized to;
maintaining a third data structure comprising, for each of the plurality of shared read-only objects, an indication of which secondary nodes are reading which shared read-only objects;
maintaining a fourth data structure comprising, for each of the plurality of shared read-only objects, a reference count indicating a number of active read transactions for the shared read-only object;
identifying which of the plurality of shared read-only objects can be garbage collected using, at least in part, the first data structure, the second data structure, the third date structure, and the fourth data structure; and
garbage collecting any identified shared read-only objects.

2. The method of claim 1, wherein the first data structure further comprises, for each of the plurality of shared read-only objects:
an object identifier for the shared read-only object; and
a root block associated with the shared read-only object.

3. The method of claim 1, further comprising:
synchronizing the first data structure to the plurality of secondary nodes.

4. The method of claim 1, further comprising:
receiving, from a secondary node, an updated global commit id that the secondary node is synchronized to; and
in response to receiving the updated global commit id, updating the second data structure to include the updated global commit id for the secondary node.

5. The method of claim 1, further comprising:
receiving, from a secondary node, an indication that identifies which shared read-only objects the secondary node is currently reading; and
in response to receiving the indication identifying which shared read-only objects the secondary node is currently reading, updating the third data structure to indicate that the secondary node is currently reading the identified shared read-only objects.

6. The method of claim 1, further comprising:
upon startup, performing an initialization procedure comprising:
initializing the third data structure to list each of the plurality of secondary nodes for each of the plurality of shared read-only objects, which indicates that each of the plurality of secondary nodes is currently reading each of the plurality of shared read-only objects.

7. The method of claim 1, wherein identifying which of the plurality of shared read-only objects can be garbage collected comprises, for each of one or more of the plurality of shared read-only objects:
when the first data structure indicates that the shared read-only object is readable, which is based at least in part on the "deleted at" value stored in the first data structure, retaining the shared read-only object;
otherwise, when the reference count is not zero for the shared read-only object, retaining the shared read-only object;
otherwise, when any secondary node is reading the shared read-only object, retaining the shared read-only object;
otherwise, when the respective second global commit id from the second data structure for any secondary node is less than the "deleted at" value for the shared read-only object, retaining the shared read-only object; and
otherwise, identifying the shared read-only object for garbage collection.

8. The method of claim 1, wherein the method is performed by a coordinator node of the hybrid distributed database system.

9. The method of claim 8, wherein the plurality of shared read-only objects are stored in shared storage and are readable by the coordinator node and the plurality of secondary nodes.

10. One or more computing devices comprising:
processors; and
memory;
the one or more computing devices configured, via computer-executable instructions, to perform operations to manage shared read-only objects in a hybrid distributed database system, the operations comprising:
maintaining a first data structure comprising, for each of a plurality of shared read-only objects, a "deleted at" value for storing a first global commit id of a delete transaction that deleted the shared read-only object, the delete transaction including a performance of a global commit to commit a received request to delete the shared read-only object;
maintaining a second data structure comprising, for each of a plurality of secondary nodes, a respective second global commit id that the secondary node is synchronized to;
maintaining a third data structure comprising, for each of the plurality of shared read-only objects, an indication of which secondary nodes are reading which shared read-only objects;
maintaining a fourth data structure comprising, for each of the plurality of shared read-only objects, a reference count indicating a number of active read transactions for the shared read-only object;
identifying which of the plurality of shared read-only objects can be garbage collected using, at least in part, the first data structure, the second data structure, the third date structure, and the fourth data structure; and
garbage collecting any identified shared read-only objects.

11. The one or more computing devices of claim 10, wherein the first data structure further comprises, for each of the plurality of shared read-only objects:
an object identifier for the shared read-only object; and
a root block associated with the shared read-only object.

12. The one or more computing devices of claim 10, the operations further comprising:
synchronizing the first data structure to the plurality of secondary nodes.

13. The one or more computing devices of claim 10, the operations further comprising:
receiving, from a secondary node, an updated global commit id that the secondary node is synchronized to; and
in response to receiving the updated global commit id, updating the second data structure to include the updated global commit id for the secondary node.

14. The one or more computing devices of claim 10, the operations further comprising:
receiving, from a secondary node, an indication that identifies which shared read-only objects the secondary node is currently reading; and
in response to receiving the indication identifying which shared read-only objects the secondary node is currently reading, updating the third data structure to indicate that the secondary node is currently reading the identified shared read-only objects.

15. The one or more computing devices of claim 10, the operations further comprising:
upon startup, performing an initialization procedure comprising:
initializing the third data structure to list each of the plurality of secondary nodes for each of the plurality of shared read-only objects, which indicates that each of the plurality of secondary nodes is currently reading each of the plurality of shared read-only objects.

16. The one or more computing devices of claim 10, wherein identifying which of the plurality of shared read-only objects can be garbage collected comprises, for each of one or more of the plurality of shared read-only objects:
when the first data structure indicates that the shared read-only object is readable, which is based at least in part on the "deleted at" value stored in the first data structure, retaining the shared read-only object;
otherwise, when the reference count is not zero for the shared read-only object, retaining the shared read-only object;
otherwise, when any secondary node is reading the shared read-only object, retaining the shared read-only object;
otherwise, when the respective second global commit id from the second data structure for any secondary node is less than the "deleted at" value for the shared read-only object, retaining the shared read-only object; and
otherwise, identifying the shared read-only object for garbage collection.

17. One or more computer-readable storage media storing computer-executable instructions for execution on one or more computing devices to perform operations for managing shared read-only objects in a hybrid distributed database system, the operations comprising:
storing in at least a first data structure, for each of a plurality of shared read-only objects, a "deleted at" value for storing a first global commit id of a delete transaction that deleted the shared read-only object, the delete transaction including a performance of a global commit to commit a received request to delete the shared read-only object;

storing, for each of a plurality of secondary nodes, a respective second global commit id that the secondary node is synchronized to;

storing, for each of the plurality of shared read-only objects, an indication of which secondary nodes are reading which shared read-only objects;

storing, for each of the plurality of shared read-only objects, a reference count indicating a number of active read transactions for the shared read-only object;

identifying which of the plurality of shared read-only objects can be garbage collected by evaluating, for each of one or more of the plurality of shared read-only objects, a plurality of garbage collection rules comprising:

when the "deleted at" value for the shared read-only object indicates that the shared read-only object is readable, retaining the shared read-only object;

otherwise, when the reference count is not zero for the shared read-only object, retaining the shared read-only object;

otherwise, when any secondary node is reading the shared read-only object, retaining the shared read-only object;

otherwise, when the respective second global commit id for any secondary node is less than the "deleted at" value for the shared read-only object, retaining the shared read-only object;

otherwise, identifying the shared read-only object for garbage collection; and garbage collecting any identified shared read-only objects.

18. The one or more computer-readable storage media of claim 17, the operations further comprising:

synchronizing the first data structure to the plurality of secondary nodes.

19. The one or more computer-readable storage media of claim 17, the operations further comprising:

receiving, from a secondary node, a status report message comprising:

an updated global commit id that the secondary node is synchronized to; and an indication that identifies which shared read-only objects the secondary node is reading; and in response to receiving the status report message:

updating the stored respective second global commit id for the secondary node to be the updated global commit id; and updating the stored indication of which shared read-only objects the secondary node is reading to be the received indication identifying which shared read-only objects the secondary node is reading.

20. The one or more computer-readable storage media of claim 17, the operations further comprising:

upon startup, performing an initialization procedure comprising:

initializing the stored indications of which secondary nodes are reading which shared read-only objects to list each of the plurality of secondary nodes for each of the plurality of shared read-only objects, which indicates that each of the plurality of secondary nodes is currently reading each of the plurality of shared read-only objects.

\* \* \* \* \*